Figure 1:
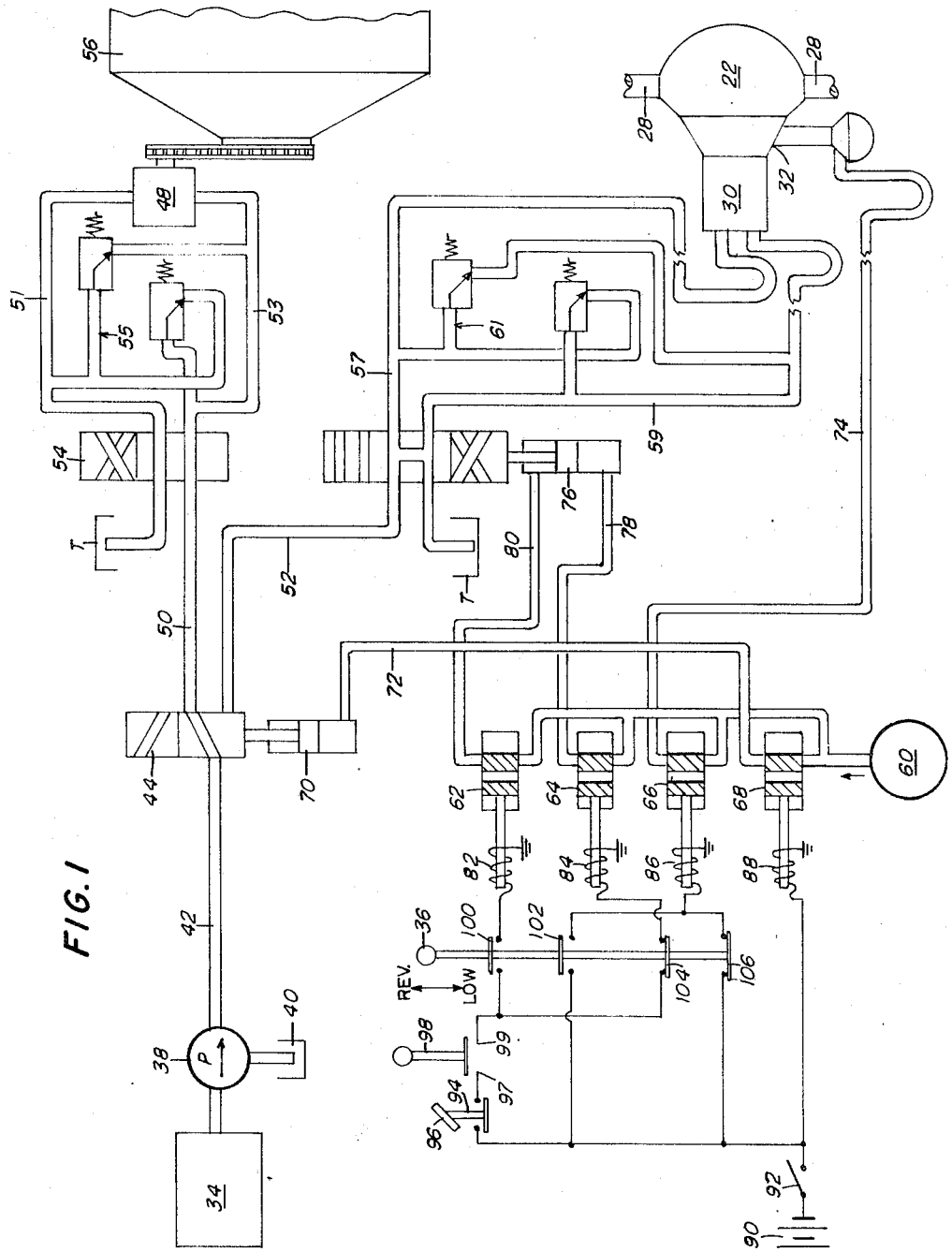

Dec. 27, 1966

G. STEIN ETAL 3,293,942

TRAILER TRANSMISSION

Filed Feb. 14, 1964

2 Sheets-Sheet 2

INVENTORS
**GARY STEIN
RICHARD C. HARE
WILLIAM A. HOHL**

BY *John J. Byrne*
ATTORNEY

United States Patent Office 3,293,942
Patented Dec. 27, 1966

3,293,942
TRAILER TRANSMISSION
Gary Stein, New Berlin, Richard C. Hare, Wauwatosa, and William A. Hohl, Brookfield, Wis., assignors to Applied Power Industries, Inc., Milwaukee, Wis., a corporation of Wisconsin
Filed Feb. 14, 1964, Ser. No. 344,978
2 Claims. (Cl. 74—664)

The present invention relates generally to drive connections for use between an engine driven vehicle and a trailer having a driven axle, and more particularly relates to a drive connection for use with a tractor-trailer combination having a concrete mixer mounted on the trailer.

In general, the present invention is applicable to a tractor-trailer, having the rear trailer axle employed as an assisting drive means under some conditions. Having power driven rear wheels in a transit mixer is especially advantageous at construction sites where it is necessary for the mixer to move as closely as possible to the area at which the concrete is to be deposited. At such areas, the footing is oftentimes difficult due to recent earth moving, ice and mud. An important objective of the invention therefore is to provide a drive mechanism for directing a portion of the power from the main drive of a tractor-trailer combination to a trailer drive under desirable conditions.

In recent years the trucking industry has made many improvements for distributing truck loads to lessen highway deterioration. A common means for accomplishing this is to adjust the vehicle wheel base in certain instances to distribute axle loads in order that no one will subject the highway beyond a safe maximum limit. An area where the axle load problem is accentuated is in the art of transit mixers where extremely heavy loads are carried from the supply depot to the construction site and at the site, it is necessary to have considerable maneuverability and control. It is a principal objective of this invention to provide means for adjusting load distribution by moving the rear trailer axles and obtaining control and maneuverability by providing power to said rear axle.

Having a concrete mixer mounted on a trailer rather than on the bed of the prime mover contributes some important benefits. One benefit is the ability to interchange prime movers with different trailers. Another benefit is the relative ease with which a wheel assembly on a trailer may be adjusted along the longitudinal length of the trailer frame for load distribution. Heretofore, a principal disadvantage of the trailer mounted mixer was the difficulty encountered in connecting power to the rear trailer axle and this difficulty is amplified when this rear axle is adjustably mounted. Another objective of this invention is to provide a drive connection between a tractor and a trailer where said trailer is supported on a driven, adjustable wheel assembly.

A further objective of the invention is to provide a transit mixer in which the prime mover tractor is driven via a mechanical system and in which the trailer support elements, including the mixing drum and ground engaging wheels, are driven hydraulically.

An additional object of the present invention is to provide a connecting hydraulic drive between a prime mover and a trailer-mounted, driven concrete mixer with means to divert the hydraulic power normally utilized by the mixer to a supplemental transit assist axle to which the rear supporting wheels of the tractor are mounted.

A still further objective of the invention is to provide synchronized connections between the mechanical and hydraulic circuitry such that the driven trailer axle cannot be operated unless the main tractor mechanical gearing is in either its lowest forward or reverse position and is immediately rendered inoperative if the clutch of the main transmission is depressed.

Another important objective of the invention is to provide a transit mixer having a hydraulically driven rear trailer axle motor having an output of slightly less revolution per time than that of the main tractor transmission at the lowest gear level of the latter, together with means for not operating the trailer drive except when the tractor drive is at said gear level.

Figure 2:
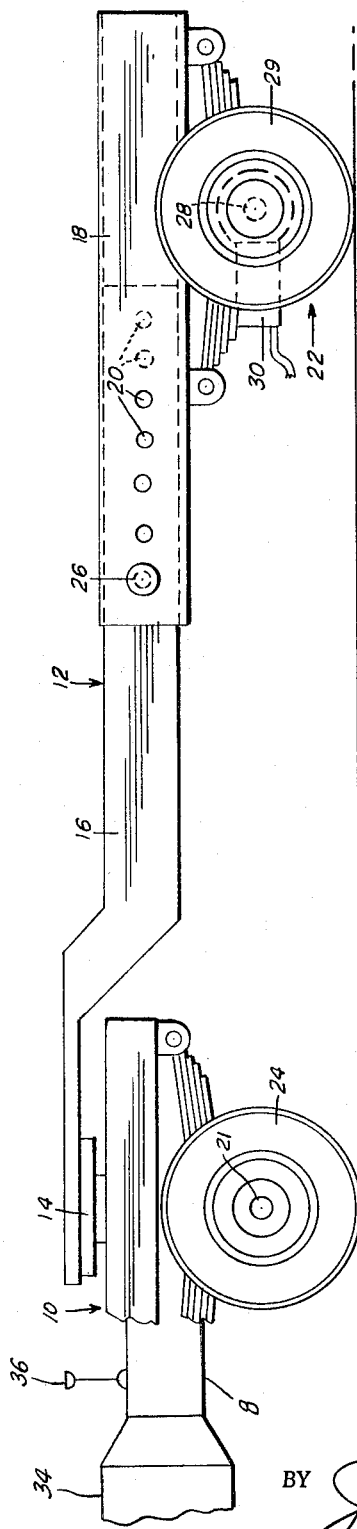

These and other important objectives and advantages of the invention will be more fully understood upon a reading of the following specifications taken in view of the attached drawings, wherein:

FIGURE 1 is a diagrammatic-schematic showing of the hydraulic, electric and pneumatic circuitry for selecting and controlling the power outputs; and FIGURE 2 is a partial diagrammatic elevation view emphasizing the importance of the invention.

Referring now to the drawings where like numerals indicate like elements, there is shown a prime-moving tractor 10 connected to a trailer 12 through a fifth-wheel connection, designated by the numeral 14. The trailer 12 is of a divided, adjustable length type comprised generally of a front framework 16 and a rear framework 18. Only the left side of the tractor-trailer combination is disclosed, it being understood that the right half is identical thereto. The rear framework 18 telescopically receives the leading portion 18. The telescoping portions are each manufactured with a plurality of transverse apertures 20 which are aligned and secured for varying the ovreall trailer length. The overall wheel base is thus adjusted between wheel assembly 22, which supports the trailer, and the tractor wheels 24. The sides of the telescoping frameworks are secured to one another by standard means, for instance by inserting pins 26 into one or more pairs of aligned apertures.

The rear wheel assembly 22, which supports the trailer 12, includes a driven axle 28 having wheels 29 supported at either end thereof. Said assembly carries a hydraulic motor 30 to power the axle through a mechanical gearing and clutch assembly 32. The assembly is operated by a conventional air-operated spring return mechanism 33. The assembly is normally spring-biased to its neutral position except when mechanism 33 is pressurized by conduit 74 in a manner hereinafter described.

The tractor unit is powered by an internal combustion engine 34 having an output in driving connection with axles 21 and wheels 24 through an ordinary mechanical transmission 8. As is customary in such transmissions, a gear shift lever 36 is provided so that the vehicle operator may selectively vary engine output. The engine 34 and its particular transmission are not considered as included within the range of this invention, but, as will be understood below, the transmission lever is adapted to activate certain control switches of the invention when selecting certain levels of transmission.

The engine 34 is also in driving engagement with a hydraulic pump 38 which is fed from a reservoir 40. The pump 38 delivers its fluid output through a conduit 42. The pump may be of the type described and claimed in United States Patent Number 2,997,956, issued to Phillip G. Stewart on August 29, 1961. The output 42 leads to a valve 44 which has a center slide element for selectively routing fluid from the pump to either a mixing drum motor 48 via conduit 50 or to the previously mentioned trailer assist motor 30 via conduit 52.

Interposed between valve 44 and the motor 48 is a manually controlled slide valve 54 for determining the direction of rotation of the mixing drum 56. For this directional purpose, lead and return conduits 51 and 53 between valve 54 and motor 48 are provided. A line equalizing safety network 55 provides a fluid outlet in the event dangerous pressures develop in the mixer system.

Interposed along conduit 52 between valve 44 and motor 30 is a directional valve 58 for selectively determining the forward or reverse drive transmitted to the trailer wheels 29. Lead and return lines 57 and 59, between valve 58 and motor 30, are provided for directional purposes. Another safety network 61 provides a fluid outlet for excessive pressures in the transit assist drive system.

The tractor-trailer combination is also provided with a pneumatic compressor 60 which is operably connected to engine 34 by any convenient means or may have an independent engine. The compressor 60 furnishes a constant air supply to a series of solenoid operated air valves 62, 64, 66 and 68. Output from valve 68 is connected to a single acting air cylinder 70 via the air hose 72. The output from valve 66 is to trailer axle gearing 32 which, as previously mentioned, is engaged when air pressure is applied and spring loaded to a disengaged position. The output from direction valve 58 is operably connected to and controlled by a double acting air cylinder 76, the chambers of which are respectively connected to the output hose 78 of valve 64 and to the output hose 80 of valve 62. As diagrammatically shown in FIG. 1, the air operated valves are opened when solenoids 82, 84, 86 and 88 are energized and in their air blocking position when not energized.

A direct current source 90 is provided as an energizing supply for the solenoids. A toggle 92 is closed when it is desired to use the trailer assist. In series with the toggle is a switch 94 which is closed when the clutch 96 is in its raised position and opened when the clutch is depressed (transmission disengaged position). Also in series with toggle 92 and switch 94 is an auxiliary transmission switch 98 which is in "low" when switch 98 bridges contacts 97 and 99.

The switches associated with the transmission lever 36 are shown diagrammatically in FIG. 1. The lever carries two switch arms 100 and 102 which close their respective lines when the lever assumes its "low" position, and switch arms 104 and 106 which close their respective lines when the lever 36 is in its reverse position. As is commonly the case in this type vehicle, the reverse gear ratio is the same as the lowest gear ratio of the forward speeds. It should be understood that in all other forward speed positions, the arms 100 and 106 do not span their respective lines.

The toggle 92 is normally open causing valves 62 through 68 to be de-energized resulting in the output from pump 38 to be routed entirely to motor 48 of the concrete mixer system. When it is desired to utilize the trailer assist, toggle 92 is closed, whereupon solenoid valve 68 is actuated and air pressure from compressor 60 is communicated to air cylinder 70 via line 72. The piston rod of the air cylinder moves the slide plate of directional valve 44 to a position where fluid from pump 38 is diverted to the transit assist motor 30 via line 52.

Before the trailer assist is operational, the clutch 96 must be up and the transmission shift levers 36 and 98 positioned in "low" or "reverse." When in reverse, the position in FIGURE 1, the mechanism 33 is pressurized via line 74 because of the energization of solenoid 86 resulting from the closing of switch 106. When in lowest forward, the mechanism 33 is pressurized via 74 because of the energization of solenoid 86 resulting from the closing of switch 102. It can be seen that the position of directional valve 58 is dependent on the energization or deenergization of solenoid valves 82 and 84 dependent upon the position of lever 36 as it effects the opening or spanning of switches 100 and 102. The above requirements insure that there is no trailer assist connection or performance when the mechanical transmission to wheels 24 has a much faster rotation than the tractor assist motor 30.

It is important in the design of the tractor-trailer combination of this invention that the hydraulic motor 30 function only as a power "assist" for the unit, i.e., it should never be called upon to serve as the sole or primary source of power for the unit since if this should occur the assist equipment would be damaged. To insure that motor 30 will never function as anything but a power assist, the gear ratio of engine 34 to tractor wheels 24 is designed to be slightly less than the gear ratio of motor 30 to trailer wheels 29. For example, in the preferred embodiment of this invention the ratios of engine 34 to wheels 24 in low-low forward and low-low reverse are 87.4 to 1 and 89.3 to 1, respectively, while the ratio of hydraulic motor 30 to wheels 29 is 106 to 1 in both forward and reverse. Thus it is seen that when the unit is operated in transit assist, motor 30 will assist in powering the vehicle only when the tractor wheels 24 driven by engine 34 tend to start slipping. While the preferred differential between the gear ratios of the tractor and trailer wheels will normally fall within the range of about 5–12% such differential could vary all the way from about 1–20% in some situations.

While as stated above it is important that the trailer drive motor 30 function only as a power assist, it is also important that the trailer axle not be dragged or pushed by the tractor. Such dragging or pushing causes the wheels to act as plows resulting in many instances in serious dirt pile-up. It is at this point where plowing tends to occur which governs the amount of differential between ratios which can be tolerated. Within the ranges of ratio differential set forth above for the low-low forward and low-low reverse gears, the trailer wheels will tend to follow or keep up with the tractor wheels when the transit assist motor 30 is engaged. When the main transmission is in any gear except low-low or reverse, the clutch mechanism maintains the motor 30 out of a drive relationship with assembly 22 and axles are "free-wheeling" and do not create a drag to the tractor drive wheels.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:
1. A drive apparatus for a vehicle having first and second driven axles, a power unit for said first axle, a mechanical transmission means having first and second output levels drivingly connecting said power unit with said first axle; gear shift means for said mechanical transmission for selecting the desired output level; a hydraulic pump driven by said power unit; hydraulic fluid hose means operatively connecting said hydraulic pump with said hydraulic drive means; and control means for said hydraulic drive means operable to prevent said hydraulic pump from delivering power to said second axle unless said mechanical transmission means has been shifted to its first output level, a clutch means operable between neutral and drive positions and adapted to engage and disengage said hydraulic drive means with said second axle, means for said clutch means operable to en- gage said clutch means only when said mechanical transmission means has been shifted to its first output level, said power unit having a gear ratio to said first axle in said first output level slightly less than the gear ratio of said hydraulic drive means to said second axle.

2. A drive apparatus according to claim 1 in which the differential between the gear ratios of the first and second axles falls within the range of about 1 to 20%.

References Cited by the Examiner
UNITED STATES PATENTS

| 2,851,115 | 9/1958 | Buckendale | 180—23 |
| 3,209,850 | 10/1965 | Fish | 180—14 |

DAVID J. WILLIAMOWSKY, *Primary Examiner.*

J. R. BENEFIEL, *Assistant Examiner.*